Feb. 20, 1962

J. D. SELLERS 3,021,989

TAPE HANDLING MECHANISM

Filed Aug. 24, 1959

2 Sheets-Sheet 1

INVENTOR.
Jack D. Sellers.
BY
Harness, Dickey & Pierce
ATTORNEYS.

Feb. 20, 1962 J. D. SELLERS 3,021,989

TAPE HANDLING MECHANISM

Filed Aug. 24, 1959

2 Sheets-Sheet 2

INVENTOR.
Jack D. Sellers
BY
Harness, Dickey + Pierce,
ATTORNEYS.

3,021,989
TAPE HANDLING MECHANISM
Jack D. Sellers, 16722 Oakfield, Detroit, Mich.
Filed Aug. 24, 1959, Ser. No. 835,546
12 Claims. (Cl. 226—118)

This invention relates to tape handling mechanisms.

While the principles of the invention are applicable to a variety of tape handling requirements, the fullest advantage of certain of the features of the invention is achieved when the principles of the invention are applied to a passive tape handling mechanism for handling an elongated continuous loop of tape which is driven by a separate driving capstan. In various information and/or data recording or storing systems, means in the form of a pickup or recording head are provided for repetitively scanning the length of a continuous loop of tape. The major portion of the tape is stored within a container, with a traveling section of the tape being, at any instant, disposed outside of the container for movement into sensing relationship with the head.

In general, the storage means has primarily taken two forms in the prior practice. In one case, the tape is disposed upon a spool except for a loop thereof which extends past the magnetic head. The tape is drawn from the center of the spool and returned to the outside periphery of the spool. The drawing of the tape from the center of the spool produces rotation of the spool to cause the sensed tape to be wound upon the outer surface of the spool. Since the circumferential length of an inner turn is much less than the circumferential length of an outer turn, such a system requires that the successive turns of the tape on the spool continuously shift relative to one another. In another system, the tape is driven into a storage volume and is permitted to assume a serpentine shape within that volume, the tape entering that volume at one point and being drawn from that volume at another point. Certain of the principles of the present invention are directed to a system of the latter nature and specifically pertain to means for transporting the tape into the volume.

In general, in accordance with certain of the principles of the present invention, a first roll engageable with the tape is disposed adjacent the output port of the storage volume and ahead (upstream) of the driving capstan and is rotated as a result of the movement of the tape by the capstan. A second roll, disposed, for example, adjacent the input port of the storage volume, is also engageable with the tape and is effective when rotated to move the tape, as it travels beyond (downstream from) the capstan, into the storage volume. This latter roll is driven by the former roll by means, for example, of a belt-drive between those two rolls. Thus, the tape handling mechanism itself is passive in that neither the output roll nor the input roll is directly driven by a motor. Rather, the traveling tape, driven by the capstan, drives the roll which is associated with the output of the storage volume and that roll in turn drives the roll which is disposed adjacent the input port to the storage volume. Preferably, the input roll is over-driven, that is, its surface speed is greater than the surface speed of the output roll as accomplished either by adjusting the ratio of the pulleys associated with the individual rolls or by making the roll adjacent the input port larger in diameter than the roll adjacent the output port.

In order to establish a driving relationship between the rolls and the tape, a pressure roll is disposed adjacent each of the input and output rolls. Certain features of the invention relate to the means for mounting those pressure rolls and the physical relationship between each pressure roll and its associated main roll to insure proper operation and to prevent breakage of the tape in the event that a deformed or spliced portion of the tape enters the nip between the pressure and main rolls.

The nature of the invention, and its objects and features, will be apparent from the following detailed description of an embodiment of the invention when read with reference to the accompanying drawings, in which:

FIG. 7 is a horizontal sectional view taken substantially along the line 7—7 of FIG. 1.

Figures 1, 4:
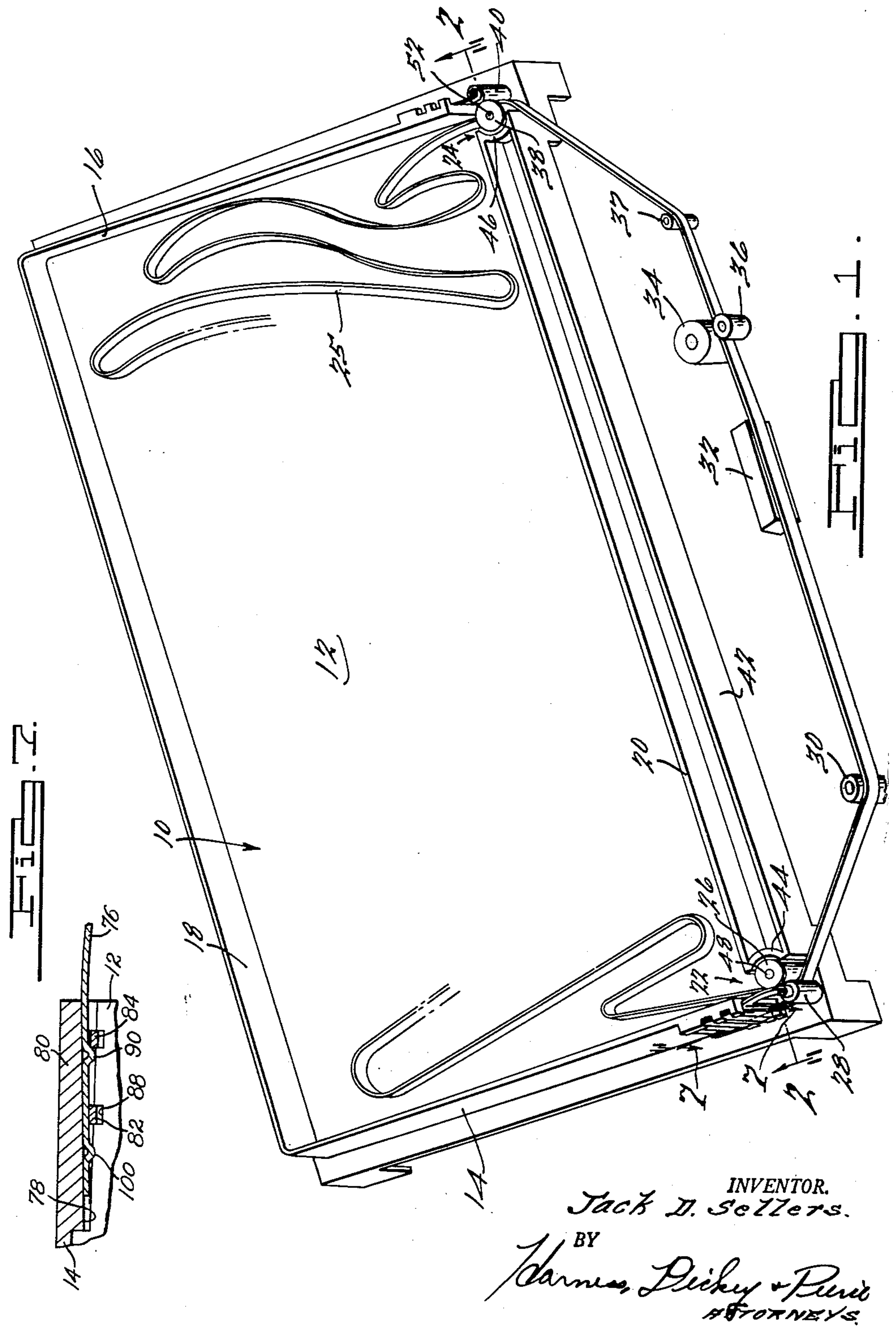
FIGURE 1 is a perspective view of a tape handling mechanism embodying the principles of the present invention.
FIG. 4 is an enlarged view of a portion of the apparatus of FIG. 1.

The tape handling apparatus as shown in FIG. 1 of the drawings comprises a tape storage volume 10 defined by a base surface 12, end walls 14 and 16 mounted on or integral with the base surface, and side walls 18 and 20. A top cover (not shown) may also be provided if desired. Side wall 20 extends into proximity to but does not engage end wall 14 to define an output port 22, and side wall 20 extends into proximity to but does not engage side wall 16 to define an input port 24. A tape 25 which may, for example, be a magnetic tape conventionally used to record or store information or data, is serpentinely disposed within the storage volume 10, extends through the output port 22, between a first or output roll 26 and an idler or pressure roll or cylindrical member 28, over a guide roll 30, past a magnetic head (pickup, record, or both) 32, between a driving capstan 34 and its associated pressure roll or plate 36, over a guide roll 37, between a second or input roll 38 and its associated idler, pressure or pinch roll or cylindrical member 40, and through the input port 24 to the volume 10. The tape is a continuous loop and builds up within the volume 10 in an irregular pattern. The pattern tends to migrate to the left in the illustration of FIG. 1 so that each point of the tape progresses through the volume 10 to the output port then through the above described path past the head 32 for recordation or sensing.

To prevent fouling of the serpentining portion of the tape with the rolls 26 and 38, side wall 20 is disposed upon the volume side of a line interjoining the rolls 26 and 38, as shown. To protect the rolls, an additional wall 42 may be erected or formed integrally with the base 12 in spaced parallelism with the side wall 20 and interjoined therewith by arcuate end wall portions 44 and 46 adjacent the rolls 26 and 38, respectively.

The sole tape driving force in the system illustrated in FIG. 1 is via driving capstan 34. As capstan 34 is rotated by a motor or other means (not shown), the tape 25 is pulled from the volume 10, through the output port 22 and over roll 26. Since the tape 25 is in driving engagement with the roll 26 this movement of the tape causes roll 26 to rotate about the longitudinal axis of shaft 48. As may best be seen in FIG. 2 of the drawings, roll 26 is secured upon shaft 48 which extends through and bearingly engages the base 12. Any suitable bearing arrangement may be provided. Shaft 48 carries a pulley 50 so that pulley 50 rotates with roll 26. Similarly, input roll 38 is mounted upon a shaft 52 which is rotatably supported by the base 12 and which carries a pulley 54 secured to that shaft. A belt 56 is trained around pulleys 50 and 54 and is preferably formed of cloth or fabric or some other such material which is capable of slipping relative to the pulleys 50 and/or 54.

Figures 2, 3, 4, 5, 6:
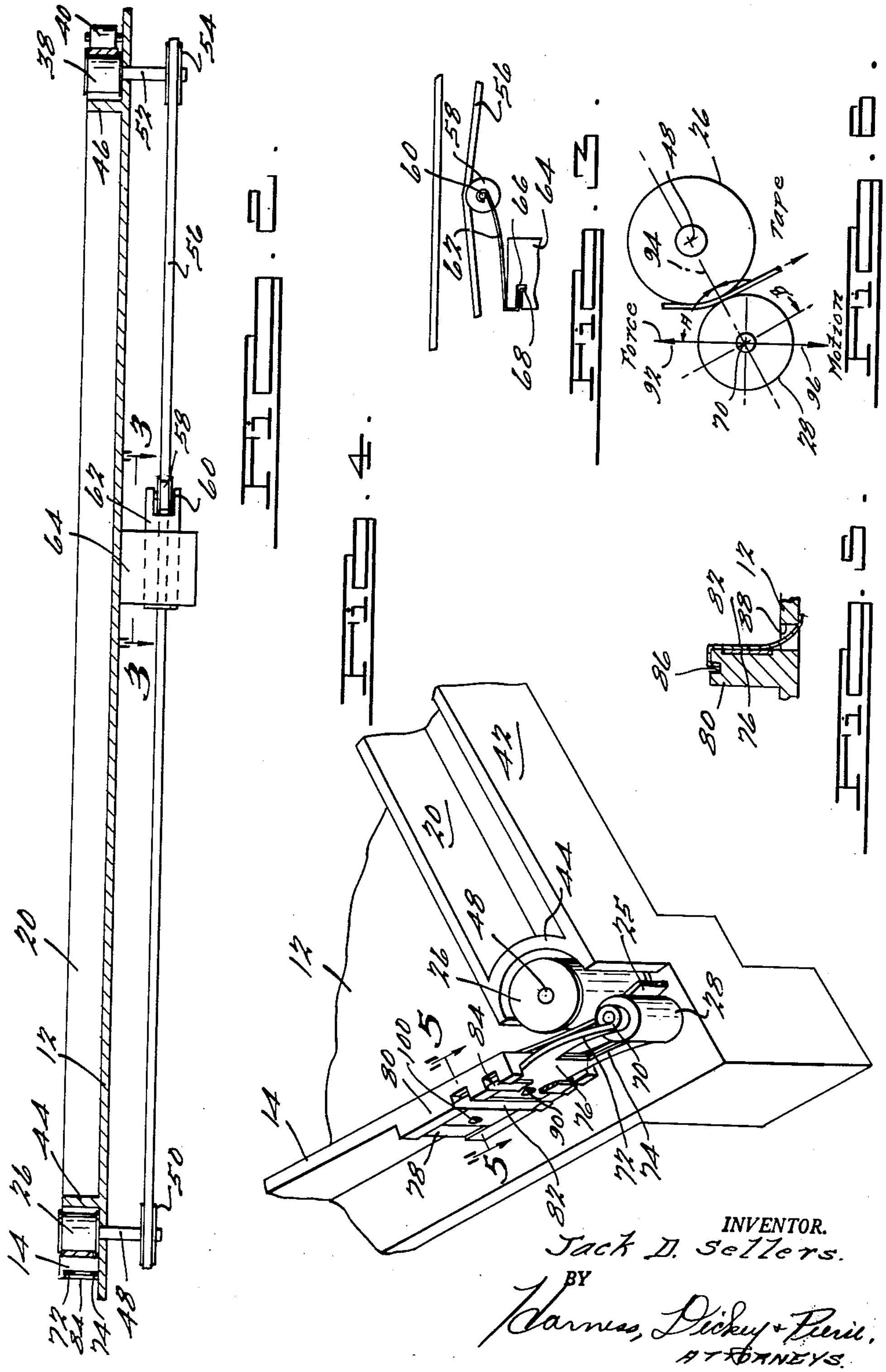
FIG. 2 is a sectional view taken substantially along the line 2—2 of FIG. 1.
FIG. 3 is a sectional view taken substantially along the line 3—3 of FIG. 2.
FIG. 5 is a section taken substantially along the line 5—5 of FIG. 4.
FIG. 6 illustrates the preferred relationship between certain elements of the apparatus of FIG. 1.

As is shown in FIGS. 2 and 3, the belt 56 is maintained under tension (to compensate for any stretching) by means of a pressure wheel 58 having a shaft 60 carried by a spring support member 62 which is secured to a block 64 mounted on or integral with the surface 12. In this manner, wheel 58 is forced against one reach of the belt 56 to maintain that belt under tension.

As is best shown in FIG. 2 of the drawings, the spring member 62 is a strip of spring metal the free end of which is bifurcated and the tips of each bifurcation are wrapped around the shaft 60. As may best be seen in FIG. 3, block 64 is provided with a generally L-shaped cavity 66 and the spring is conformed around the edge of the block. The end of the spring enters the cavity 66 and is bent over at the tip as at 68 to lock the spring in position. The block 64 may be grooved to the depth and width of the spring to prevent the spring from sliding relative to the block.

As the tape is drawn from the storage volume 10 by the capstan 34, the driving engagement between the tape 25 and the roll 26 causes that roll to be rotated. Rotation of roll 26 causes corresponding rotation of shaft 48 (FIG. 2) and of pulley 50 to drive belt 56 so as to cause rotation of pulley 54, shaft 52 and roll 38. Since roll 38 is in driving engagement with the portion of the tape 25 which follows the capstan 34, rotation of the roll 38 causes the tape 25 to be moved through the input port 24 into the storage volume 10.

To insure that the section of the tape between the capstan 34 and the roll 38 is maintained under tension, roll 38 is preferably driven at a higher surface speed than roll 26. This can be accomplished by making pulley 54 slightly smaller than pulley 50 so that one revolution of pulley 50 will tend to produce slightly more than a full revolution of pulley 54 and of roll 38. Alternatively, pulleys 50 and 54 may be of the same size but roll 38 may be of slightly greater diameter than roll 26, or a combination of these means may be employed. In either case, the resultant necessary slippage should occur other than between the roll 38 and the tape 25 and may occur either between the pulley 50 and the shaft 48 or between the shaft 52 and the pulley 54 or between the belt 56 and the pulley 50 or 54, or a combination of these slipping means may be provided. In the preferred arrangement, the slippage occurs between the belt 56 and the pulleys 50 and 54.

It will be observed that since roll 26 drives roll 38 through belt 56 there is some load on roll 26 tending to inhibit free rotation of that roll. As a result, a desirable retarding force is exerted upon movement of the tape 25 out of the storage volume 10 so as to maintain the section of the tape between the roll 26 and the head or heads 32 reasonably taut. It will be further observed that the fact that the tape is affirmatively driven into the volume 10 not only establishes a desirable tension in the tape between the capstan 34 and the roll 38 but also results in the tape being forced into the volume 10 so that the amount of tape which can be feasibly stored in a given volume 10 is substantially increased over the case where there is no affirmative indriving.

As may best be seen in FIG. 4 of the drawings, roll 28 rolls about the longitudinal axis of shaft 70. The tips of the legs 72 and 74 of a bifurcated spring 76 are rolled around the ends of the shaft 70. Preferably, shaft 70 constitutes a bearing for the roll 28, with the roll turning upon the shaft and the shaft being fixed against rotation relative to the member 76.

The rear end of spring 76 lies within a recess or channel 78 in a block 80 which is secured to or integral with the end wall 14. A pair of spring steel clips 82 and 84 are secured to the block 80 and engage the outer face of the member 76 to retain that member upon the block 80. As is shown in FIG. 5 of the drawings, the upper end of the spring clip 82 is bent over the edge of block 80 and its tip is deflected to enter a notch 86 on the upper surface of the block 80. The lower end of spring clip 82 extends through an aperture 88 in the base member 12 and is bent over to engage the under surface of base 12. Spring clip 84 is similarly secured in place.

A protuberance, dimple or cam element 90 is formed upon the outer surface of the spring 76 in a position such that it is pressing against the spring clip 84 when the roll 28 is appropriately positioned. The parts are dimensioned so that the roll 28 is forced into intimate engagement with the roll 26. Spring 76 is, under this condition, slightly bowed, as shown, to exert a force tending to move the longitudinal axis of the roll 28 in a direction generally towards the shaft 48. Additionally, the elements including cam 90 and clip 84 serve to exert a force through spring 76 tending to move the longitudinal axis of roll 28 in a direction towards the clip 84.

It will be observed in FIG. 4 that the longitudinal axis of the roll 28 is disposed forwardly of a line passing through the axis of shaft 48 and perpendicular to the spring 76. As is shown in the drawing of FIG. 6, as a result of this arrangement, the force 92 exerted by spring 76 upon the roll 28 tending to move the axis of the shaft 70 in a direction toward the supporting clips is exerted at an acute angle A to the line 94 interjoining the longitudinal axes of shafts 70 and 48. Accordingly, if an irregularity or splice upon the tape enters the nip between rolls 28 and 26, tending to move the roll 28 in translation along the path of the tape, the resilience of element 84 will permit some slight motion in this direction. This direction of motion, identified 96 in FIG. 6 of the drawings is at an obtuse angle B to the line 94 interjoining the longitudinal axes of the shaft 70 and the shaft 48. The effect of this movement of the roll 28 is to tend to separate the roll 28 from the roll 26 to permit the enlarged portion of the tape to pass therebetween. It will be observed that if the longitudinal axis of the shaft 70 were disposed toward the block 80 from a line extending through the longitudinal axis of shaft 48 and perpendicular to spring 76, the effect of the force exerted by an enlargement in the tape would be to tend to drive the roll 28 into tighter engagement with the roll 26, thereby tending to break the tape.

As the roll 28 is moved in the direction 96, the extent of the resilient bias exerted by spring 84 and cam 90 tends to increase to exert a return force tending to move roll 28 back to its illustrated position as soon as the enlarged portion of the tape is passed beyond the rolls. It will further be observed that the provision of the bifurcated spring 76 enables the roll 28 to automatically align with the roll 26 so that they make full line engagement and to prevent any cocking of roll 28 which would tend to drive the tape upwardly or downwardly.

The cooperation between rolls 38 and 40 and the mounting of roll 40 may be similar to that just described in connection with rolls 28 and 26 except that since the tape 25 is moving inwardly at this point, the rolls 40 should be disposed slightly rearward of a line through the longitudinal axis of the roll 38 and parallel with the side wall 20.

It will be seen that with the pressure rolls supported as illustrated, those rolls are self-adjusting, tending to maintain a constant pressure holding the tape against the associated main rolls while yet reducing the possibility of jamming or tape breakage.

To facilitate loading and unloading of the tape handling mechanism, the roll 28 may be manually pulled forwardly of the equipment to force the cam 90 to pass under and forwardly of the clip 84. This relieves the pressure between the rolls 28 and 26. It will be observed that the cam 90 in this circumstance serves as a detent. If desired, an additional projection 100 may be placed upon the spring 76 in a position to engage the clip 82 and establish a limit to this forward motion of the roll 28. The pressure exerted by roll 40 upon roll 38 may be similarly relieved preparatory to loading or unloading. The tape is then placed in the ports 22 and 24. To transfer the tape into the machine, roll 40 is then restored to its normal position in which it causes the tape to engage the roll 38. Desirably, the shaft of roll 38 is provided with a noncircular recess in its upper end (not shown) adapted to accept a crank by means of which roll 38 can be manually rotated to roll the tape through the input port 24 into the volume 10. This rotation of pulley 38 will produce rotation of belt 56 but there will be no outfeeding of the tape through port 22 since roll 28 is out of engagement with roll 26. When the tape has been moved into volume 10, roll 28 is then restored to its normal position as shown and the tape handling apparatus is then in condition to be associated with a capstan 34 and any other associated equipment such as a head 32 and any provided guide rolls.

It will also be noted that crank sockets may be provided in both of the rolls 26 and 38 to permit manual transfer of the tape at any time (with the capstan pressure roll 36 released) so as to permit rapid location of any desired section of the tape.

While it will be apparent that the embodiments of the invention herein disclosed are well calculated to fulfill the objects of the invention, it will be appreciated that the invention is susceptible to modification, variations and change without departing from the proper scope or fair meaning of the subjoined claims.

What is claimed is:

1. In a tape handling mechanism a first and a second cylindrical roll adaped to engage opposite faces of a tape moving therebetween, means for supporting said first roll for rotation about its longitudinal axis, and means for supporting said second roll comprising a support member, a flat spring having one end engaging said support member and the other end engaging said second roll, a projection on said one end of said spring, and resilient means acting between said support member and said projection and tending to force said spring to move axially in a direction to move said second roll into tighter engagement with said first roll.

2. The combination of claim 1 in which said projection is a cam and in which the force exerted by said resilient means increases as said second roll moves away from said support member.

3. The combination of claim 1 in which said resilient means is a spring clip also serving to secure said spring to said support member.

4. In a tape handling mechanism for association with a driving capstan for driving the tape, a first roll engageable with the tape ahead of and spaced from the capstan and rotated by and solely in response to movement of the tape, a second roll engageable with the tape following and spaced from the capstan and effective when rotated to drive the tape, and driving means for said second roll comprising said first roll and means for establishing a driving connection from said first roll to said second roll for rotating said second roll in response to rotation of said first roll by the tape.

5. In a tape handling mechanism for association with a driving capstan for driving the tape, a first roll engageable with the tape ahead of and spaced from the capstan and rotated by and solely in response to movement of the tape, a second roll engageable with the tape following and spaced from the capstan and effective when rotated to drive the tape, and driving means for said second roll comprising said first roll and means for establishing a slip driving connection from said first roll to said second roll for rotating said second roll in response to rotation of said first roll by the tape.

6. In a tape handling mechanism for association with a driving capstan for driving the tape, a first roll engageable with the tape ahead of and spaced from the capstan and rotated by and solely in response to movement of the tape, a second roll engageable with the tape following and spaced from the capstan and effective when rotated to drive the tape, and driving means for said second roll comprising said first roll and means for establishing a driving connection from said first roll to said second roll for rotating said second roll in response to rotation of said first roll by the tape comprising a pulley fixed to each of said rolls and a belt trained around said pulleys.

7. In a passive tape handling mechanism for handling an elongated continuous loop of tape driven by a driving capstan, a tape storage volume having an output port and an input port both spaced from the capstan, an output roll adjacent said output port and engageable with the tape and rotated by and solely in response to movement of the tape, an input roll adjacent said input port and engageable with the tape and effective when rotated to drive the tape from the capstan into said tape storage volume, and driving means for said input roll comprising said output roll and means for establishing a driving connection from said output roll to said input roll for rotating said input roll in response to rotation of said output roll by the tape.

8. In a passive tape handling mechanism for handling an elongated continuous loop of tape driven by a driving capstan, a tape storage volume having an output port and an input port both spaced from the capstan, an output roll adjacent said output port and engageable with the tape and rotatated by and solely in response to movement of the tape, an input roll adjacent said input port and engageable with the tape and effective when rotated to drive the tape from the capstan into said tape storage volume, and driving means for said input roll comprising said output roll and means for establishing a slip driving connection from said output roll to said input roll for rotating said input roll in response to rotation of said output roll by the tape and tending to rotate said input roll at a surface speed which is greater than the surface speed of said output roll.

9. In a passive tape handling mechanism for handling an elongated continuous loop of tape driven by a driving capstan, a tape storage volume having an output port and an input port both spaced from the capstan, an output roll adjacent said output port and engageable with the tape and rotated by and solely in response to movement of the tape, an input roll adjacent said input port and engageable with the tape and effective when rotated to drive the tape from the capstan into said tape storage volume, and driving means for said input roll comprising said output roll and means for establishing a slip driving connection from said output roll to said input roll for rotating said input roll in response to rotation of said output roll by the tape and tending to rotate said input roll at a surface speed which is greater than the surface speed of said output roll comprising a pulley fixed to each of said rolls and a slippable belt trained around said pulleys.

10. In a passive tape handling mechanism for handling an elongated continuous loop of tape driven by a driving capstan, a tape storage volume having an output port and an input port both spaced from the capstan, an output roll adjacent said output port and engageable with the tape and rotated by and solely in response to movement of the tape, an input roll adjacent said input port and engageable with the tape and effective when rotated to drive the tape from the capstan into said tape storage volume, driving means for said input roll comprising said output roll and means for establishing a slip driving connection from said output roll to said input roll for rotating said input roll in response to rotation of said output roll by the tape and tending to rotate said input roll at a surface speed which is greater than the surface speed of said output roll, and means associated with each of said rolls for forcing the tape into driving relation with the surfaces of said rolls.

11. In a passive tape handling mechanism for handling an elongated continuous loop of tape driven by a driving capstan, a tape storage volume having an output port and an input port both spaced from the capstan, an output roll adjacent said output port and engageable with the tape and rotated by and solely in response to movement of the tape, an input roll adjacent said input port and engageable with the tape and effective when rotated to drive the tape from the capstan into said tape storage volume, driving means for said input roll comprising said output roll and means for establishing a slip driving connection from said output roll to said input roll for rotating said input roll in response to rotation of said output roll by the tape and tending to rotate said input roll at a surface speed which is greater than the surface speed of said output roll, means associated with each of said rolls for forcing the tape into driving relation with the surfaces of said rolls each comprising a circular cylindrical member and means for supporting said member for rotation about its longitudinal axis and for movement of its longitudinal axis in a direction at an obtuse angle to a line between said axis and the axis of the associated roll and in the general direction of movement of the tape.

12. In a passive tape handling mechanism for handling an elongated continuous loop of tape driven by a driving capstan, a tape storage volume having an output port and an input port both spaced from the capstan, an output roll adjacent said output port and engageable with the tape and rotated by and solely in response to movement of the tape, an input roll adjacent said input port and engageable with the tape and effective when rotated to drive the tape from the capstan into said tape storage volume, driving means for said input roll comprising said output roll and means for establishing a slip driving connection from said output roll to said input roll for rotating said input roll in response to rotation of said output roll by the tape and tending to rotate said input roll at a surface speed which is greater than the surface speed of said output roll, means associated with each of said rolls for forcing the tape into driving relation with the surfaces of said rolls each comprising a circular cylindrical member and means for supporting said member for rotation about its longitudinal axis and for movement of its longitudinal axis in a direction at an obtuse angle to a line between said axis and the axis of the associated roll and in the general direction of movement of the tape and for resiliently biasing said member both in a direction opposite to said direction of movement and in a direction generally toward the longitudinal axis of said associated roll.

References Cited in the file of this patent

UNITED STATES PATENTS

| | | |
|---|---|---|
| 667,436 | Granichstaedten | Feb. 5, 1901 |
| 1,282,154 | Webster | Oct. 22, 1918 |
| 1,686,907 | Fairall | Oct. 9, 1920 |
| 1,883,987 | Lasowsky | Oct. 25, 1932 |
| 1,998,931 | Kellogg | Apr. 23, 1935 |
| 2,278,685 | Barnard | Apr. 7, 1942 |
| 2,499,699 | Tinkham | Mar. 7, 1950 |
| 2,721,650 | Cummings et al. | Oct. 25, 1955 |
| 2,865,639 | Gillette et al. | Dec. 23, 1958 |

FOREIGN PATENTS

| | | |
|---|---|---|
| 58,721 | France (Addition to No. 964,735) | Nov. 4, 1953 |